Sept. 22, 1964     H. BUCK     3,149,567

PREPARATORY FUSE

Filed May 31, 1960

*Inventor:*

United States Patent Office 3,149,567
Patented Sept. 22, 1964

3,149,567
PREPARATORY FUSE
Hans Buck, Geislinger Strasse 21, Bad Uberkingen,
Geislingen an der Steige, Germany
Filed May 31, 1960, Ser. No. 33,037
Claims priority, application Germany May 29, 1959
2 Claims. (Cl. 102—65)

The present invention relates to a preparatory fuse for incendiary compositions, for propelling charges for the launching or dropping of incendiary agents, smoke agents and explosive charges. The present invention also relates to devices consisting essentially of an incendiary composition or the like and a fuse.

It is the object of the present invention to provide ignitable agents which either constitute an incendiary composition or activate other incendiary agents and which become ineffective after a certain period, so that they can be stored without danger and can be made effective again after a storage period.

The invention is based on the following discovery: It is known that white phosphorus and other forms of phosphorus more reactive than ordinary red phosphorus ignite upon contact with oxygen, so that small amounts of such more reactive phosphorus can set off a combustible composition upon air admission.

It has been found that small amounts of finely divided white phosphorus deposited on red phosphorus or on mixtures containing red phosphorus increase the flammability of the red phosphorus or its mixtures. This readiness for ignition is lost after a certain period. On the basis of this discovery the present invention provides incendiary compositions and the like, the period of effectiveness of which can substantially be predetermined.

A preparatory fuse or a prepared incendiary composition of the invention consists essentially of a container enclosing a charge of red phosphorus or a red phosphorus containing mixture. Means are provided for converting a small portion of the red phosphorus into a more reactive form of phosphorus, whereby a preparatory fuse of the invention consisting of red phosphorus and finely divided particles of the more reactive form of phosphorus is formed. In its more specific aspects, the invention provides a closed frangible container, such as a tube, a bottle, a projectile, or a hand grenade with a phosphorus containing charge such as an incendiary composition or smoke composition. A small container in the charge holds a small amount of red phosphorus. I further provide a fuse the ignition of which heats the last mentioned amount of phosphorus to such a temperature that it is converted into the more reactive phosphorus. When the container then is broken and sufficient air is admitted to the charge the incendiary composition, smoke composition or the like is ignited and fulfills its desired function. The flammability of the small amount of more reactive phosphorus is lost after a certain period when the container is not broken and atmospheric oxygen is not admitted. The loss of flammability is probably caused by diffusion of the converted white or otherwise reactive phosphorus into the unchanged red phosphorus, and possibly also by spontaneous reversion of the more reactive modification to the red form, since white phosphorus is particularly unstable in the presence of greater amounts of the stable red form.

It is not necessary to keep the amount of red phosphorus, which is to be converted, in a special container, and other arrangements may be made to ensure that only a portion of the red phosphorus present is converted by the heat of a fuse into white or more reactive phosphorus, while the greater part of the red phosphorus present is not affected.

The following examples are illustrative of specific embodiments of projectiles according to my invention:

A container of frangible material such as plastic or glass holds a charge of red phosphorus powder or of a mixture of aluminum, magnesium, zirconium powder or of granulated alloys of these metals with red phosphorus. The container is provided with a fuse, e.g. a delayed-action fuse, of such heat capacity that the temperature and amount of heat developed can convert only a predetermined portion of the red phosphorus into white phosphorus.

The delayed-action fuse may be designed to inject a predetermined amount of incandescent material into the container, so that only a portion of the phosphorus charge which need not exceed one percent is converted into white phosphorus.

Experiments have shown that such a projectile remains armed for 20 minutes. When the container is shattered within this period, the charge ignites. When the projectile is kept intact for at least 20 minutes beyond the active period, it can be stored without danger and made ready for use by the insertion of a new fuse.

In a modification of the above arrangement, the ignition of a fuse by which a part of a red phosphorus charge is converted into the more reactive modification arms a combustible composition the ignition of which sets off a demolition charge. Such an arrangement provides double safety for the operator. The demolition charge employed is preferably of the type which is detonated only by very high temperatures. This detonation, however, depends on the initiation of the ignition process by partial conversion of the red phosphorus to more reactive phosphorus, the period of reactivity of which is limited.

A projectile of the last described type may contain a phosphorus charge which is armed by means of a small fuse, such as a delayed-action fuse. When the projectile is shattered on the target, a demolition charge is detonated by the heat of the burning phosphorus composition. The demolition charge is also contained in the projectile.

The drawing shows preferred embodiments of the preparatory fuse of the invention. These embodiments are described in detail hereinafter.

Figures 1, 2, 3:
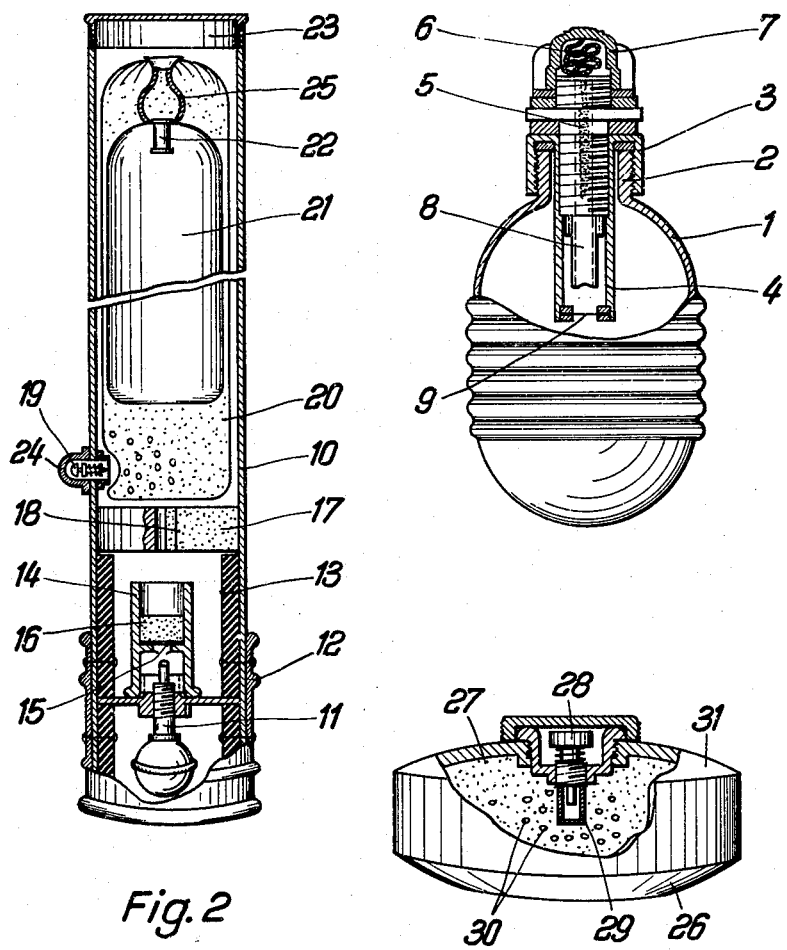
FIGURE 1 shows a hand grenade in side elevation, the body of the grenade being partly broken away in order to show the arrangement of the fuse.
FIGURE 2 shows a sectional elevation of a device for propelling a projectile including a demolition charge or smoke generating agents.
FIGURE 3 is a partly sectional view of a bomb or mine.

Referring initially to FIGURE 1 which shows an egg-shaped hand grenade, there is seen a thin hollow body 1 of pressed plastic or frangible cast metal. Its neck portion 2 is equipped with left-hand threads engaging a fuse holder 3 integral with a fuse insertion tube 4. A delayed-action fuse 5 includes a fuse cord 6 arranged in a safety cap 7 and ignites the tube 8. A foil 9 separates the interior space of the body 1 from the fuse tube. The foil consists of easily combustible or fusible material, such as nitrocellulose or tin foil. The hollow body 1 contains a demolition charge of the usual fragmentation type. This explosive charge contains no oxygen carrier, but red phosphorus which is arranged within the area adjacent the tube 8 within the explosive charge.

The delayed-action fuse is of such dimensions that the heat generated by it is only sufficient for partly converting the red phosphorus present into more reactive phosphorus, while the bulk of the explosive charge remains unaffected. Only when the grenade is thrown and oxygen is admitted through the broken body 1, can the explosive charge become effective. The effectiveness of the explosive charge may be increased by adding magnesium or aluminum powder or shot.

In the device shown a FIGURE 2 an igniter 11 is inserted into one end of a cylindrical tube 10 of pressure molded material or cardboard. The end of the tube adjacent the igniter is closed by a cap a cylindrical portion of which constitutes a gripping collar 12. The igniter 11 is threadedly mounted on a transverse partition 11' held between two asbestos sleeve members which jointly form a heat-resistant lining 13. Above the partition 11' there is arranged a container 14 which is separated from the fuse 11 by a Celluloid foil 15. The container 14 holds an incendiary composition 16 of black powder. An annular terminal face of the lining 13 supports a cork disc 17 having a central bore 18. The bore is filled with an easily combustible material, such as nitrocellulose. Above the disc 17 there is arranged on the sleeve 10 a further small fuse 19 serving for arming the charge in the bag 20. This bag consists e.g. of cellulose foil. The charge in this bag consists of a mixture including a metal powder, smoke agent or the like, and also, red phosphorus as indicated by small circles. The phosphorus is concentrated within the heating range of the fuse 19. A container 21 of easily breakable material, such as glass is embedded in the charge. It is provided at its upper end with a primer fuse, or preferably a delayed-action fuse 22. The charge of the container 21 is a fragmentation composition. The end of the tube 10 adjacent the bag 20 is closed by a plug 23 which is covered and sealed by a varnish coating. A removable threaded protective cap (not shown) may additionally be provided.

The small fuse 19 may be ignited in a conventional manner by the pressure of a spring driven bolt after the protective cap 24 is removed. The charge of the bag 20 is then "armed." This charge, however, does not ignite until sufficient oxygen for the ignition of the charge is available. This requires the igniter 11 to be pulled, whereby the black powder charge 16 is ignited. The resulting ignition of the combustible filling in the bore 18 of the disc 17 causes the bag 20 to be discharged from the tube 10 by the gas pressure developing under the disc 17. Upon impact on the target the bag 20 is shattered, oxygen is admitted to the charge, and a fire is generated at the target.

The fuse 22 in the interior container 21 is connected with the bag 20 by means of a wire 25, which activates the fuse 22 even when the container 21 is not shattered by impact. After a pre-determined period the target is subjected to the demolition or explosion effect of the charge in the container 21.

If fog generating agents are enclosed in the bag 20 there may be formed at the impact site a smoke cloud which camouflages the impact of a demolition charge. The shock action of the latter can further be increased by means of an addition of magnesium powder or the like. The blinding effect of the burning magnesium hides the impact of the demolition charge. Particularly with a time-delay ignition the explosion occurring after a certain period is unexpected.

When after the actuation of the preparatory fuse 19 the projectile is not to be launched, there exists no danger of an explosion. The charge loses its ability for ignition after a certain period. The small fuse 19 may then be replaced. The fuse burns only a hole of small diameter into the bag 20, which may be sealed by introducing fused salts which form a crust upon cooling and adhesively cover the charge so that replacement of the entire bag 20 is generally not necessary when a spent fuse 19 is replaced.

FIG. 3 shows a bomb or mine including a can type container 31 which is designed to be shattered upon dropping or by the weight of a tank driven over it. The container 31 has a heavy bottom 26 and is filled with an incendiary composition 27 in which particles of red phosphorus 30 are distributed. The container is provided with a fuse ignited by a percussion bolt 28. The fuse includes a threadedly mounted tube 29. The bolt 28 is actuated against the pressure of a spring 32. After removal of a safety cap 33, the bolt 28 may be driven into the fuse, and the bomb thereby prepared for dropping. Its charge is set off when the container 31 is broken by impact.

Similar units made of glass or the like may be charged with incendiary and flare compositions and placed on roads or in the field for mine protection of certain areas. The mines are effective only for a limited period, and may again be collected without danger after that period.

The embodiments shown are capable of modification. In the device of FIGURE 2, there may be arranged over the disc 17 a small container, such as a bag, to hold the red phosphous, or a bag containing a phosphorus bearing mixture may be provided within the heating range of the fuse 19. An additional container holding a phosphorus containing charge and a demolition charge would be arranged further forward.

If the projectile is not to be launched, and the preparatory charge has lost its efficiency which normally holds for about one hour, the smaller container which is destroyed by the fuse 19 can be removed and a new fuse can be inserted into the apparatus.

What I claim is:

1. In a fuse arrangement, in combination, a closed container of frangible material, said container defining a cavity therein; an amount of red phosphorus in said cavity; a source of thermal energy sufficient only for transforming a portion of said red phosphorus into a phosphorus of a form more reactive than said red phosphorus while leaving a major portion of said red phosphorus unchanged; a combustible material in said container for ignition by said phosphorus when said container is fractured; and an amount of air in said cavity smaller than an amount of said air sufficient for causing ignition of said more reactive phosphorus.

2. In a fuse arrangement as set forth in claim 1, a charge in said container insensitive to the thermal energy of said source and capable of being set off by the combustion of said combustible material.

References Cited in the file of this patent

UNITED STATES PATENTS 1,858,456    Mills _____ May 17, 1932

FOREIGN PATENTS 269,979    Great Britain _____ Apr. 27, 1927

OTHER REFERENCES

"Phosphorus and Its Compounds" (Van Wazer), Interscience Publishers Inc. (New York), 1958, page 115 relied on and page 112.